United States Patent [19]

Orain

[11] 4,253,776
[45] Mar. 3, 1981

[54] TORQUE TRANSMITTING ELEMENT AND DEVICE

[75] Inventor: Michel A. Orain, Conflans Ste-Honorine, France

[73] Assignee: Glaenzer Spicer, Poissy, France

[21] Appl. No.: 42,729

[22] Filed: May 25, 1979

[30] Foreign Application Priority Data

May 26, 1978 [FR] France .................. 78 15814

[51] Int. Cl.³ .................. F16D 1/00; F16L 23/00
[52] U.S. Cl. .................. 403/337; 64/21
[58] Field of Search .......... 403/288, 335, 337, 50; 64/21

[56] References Cited

U.S. PATENT DOCUMENTS

| 2,939,485 | 6/1960 | Nauheimer | 403/50 X |
| 3,208,290 | 9/1965 | Mathues et al. | 403/51 X |
| 3,858,412 | 1/1975 | Fisher et al. | 64/21 X |
| 4,053,248 | 10/1977 | Schultenkamper | 403/337 |
| 4,068,499 | 1/1978 | Sharp | 64/21 X |
| 4,074,946 | 2/1978 | Swearingen | 403/337 |
| 4,091,641 | 5/1978 | Welschof | 64/21 |
| 4,191,487 | 3/1980 | Schultenkamper | 403/337 |

FOREIGN PATENT DOCUMENTS 548757  10/1956  Italy .................. 403/337

Primary Examiner—James Kee Chi

[57] ABSTRACT

The torque transmitting connecting element, for example constituted by a flange, comprises a small number of pairs of bearing planes which are angularly spaced apart. The two planes of each pair are convergent in a direction away from the connecting face of the element and constitute the two flanks of a channel or of a projection which has a constant trapezoid cross-sectional shape which is symmetrical relative to a plane containing the axis of rotation of the element. Such elements, when they are interconnected in a torque-transmitting device, cooperate solely by their pairs of bearing planes. Bolts or a nut clamp these two elements together.

The invention is for example applicable to automobile vehicle transmissions.

12 Claims, 20 Drawing Figures

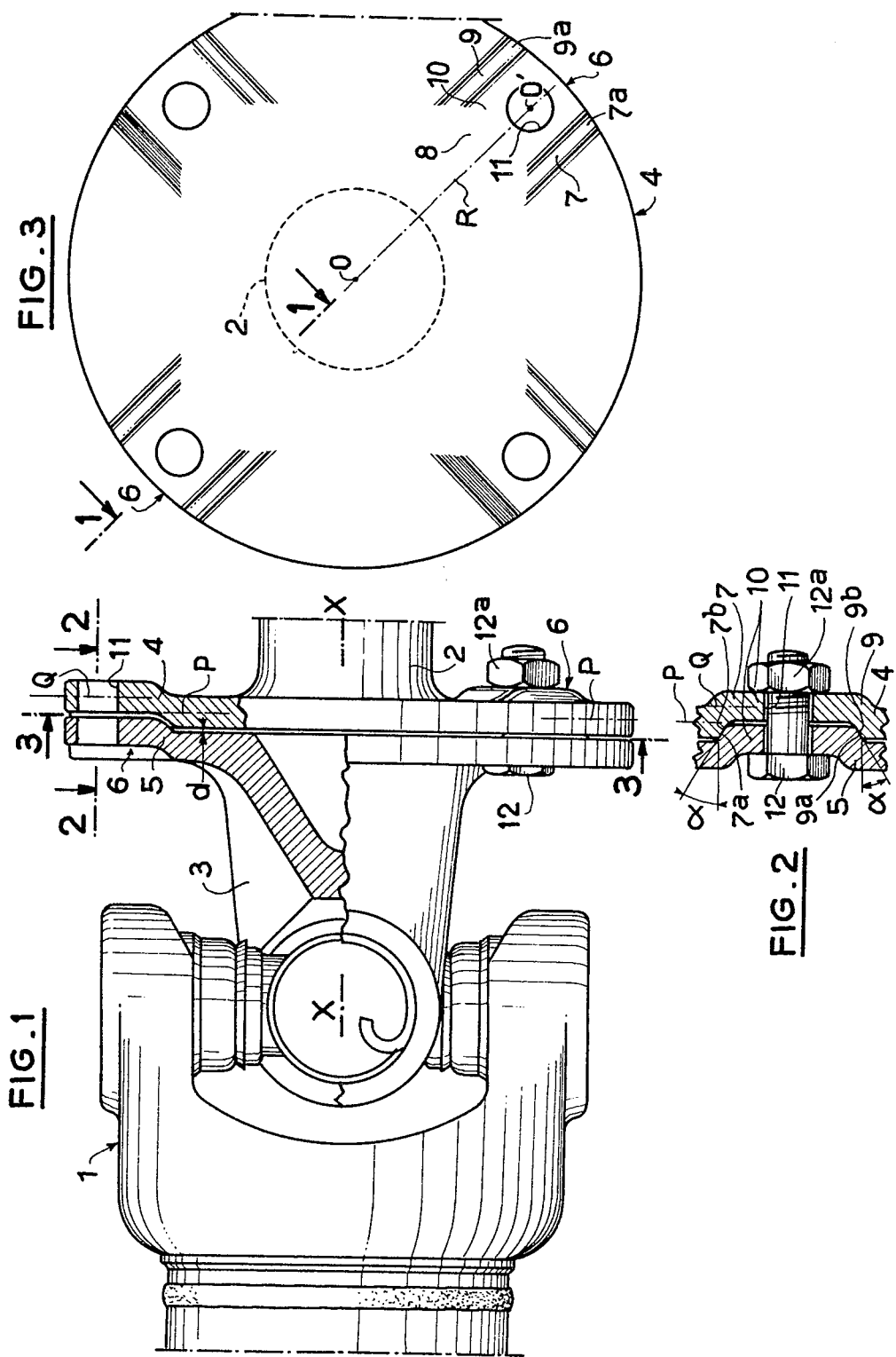

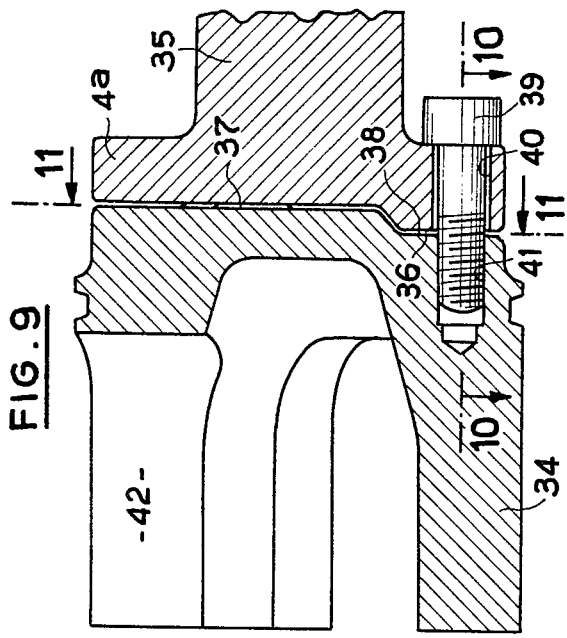
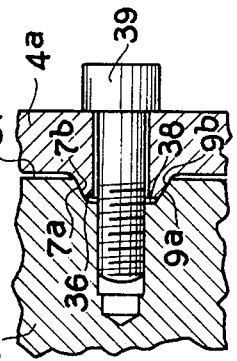
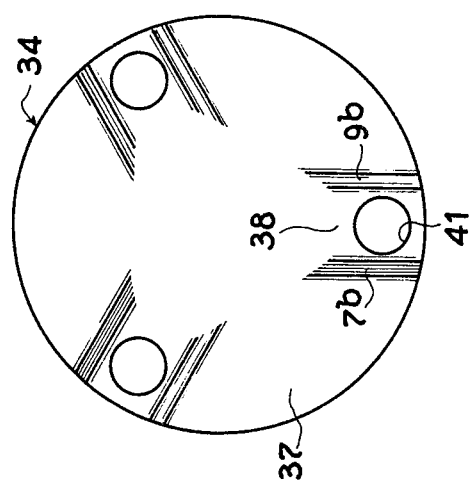

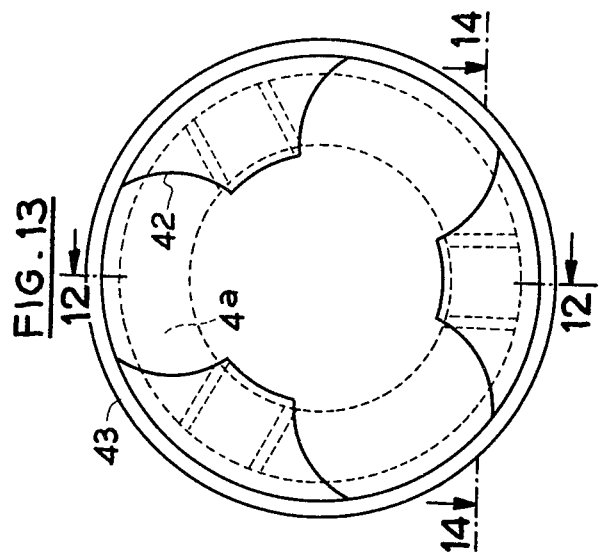
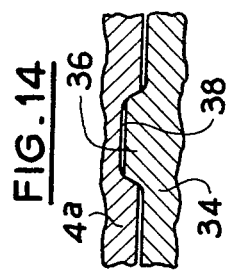
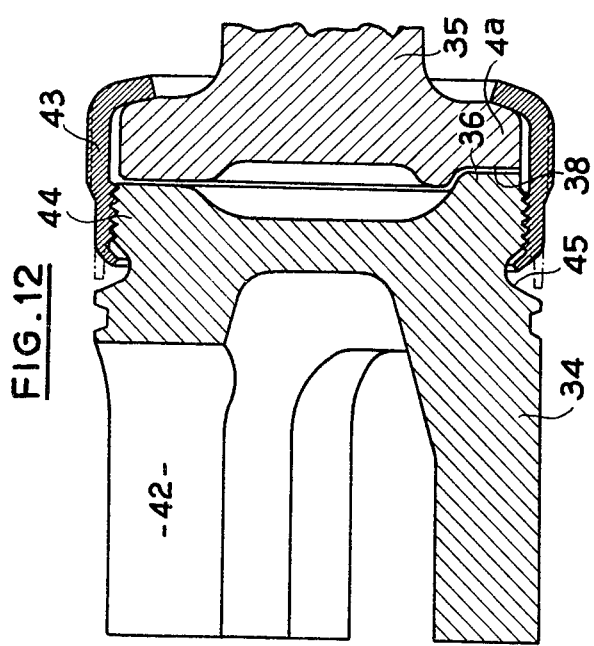
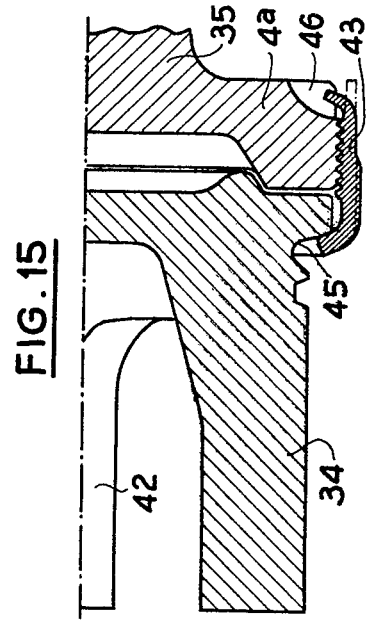

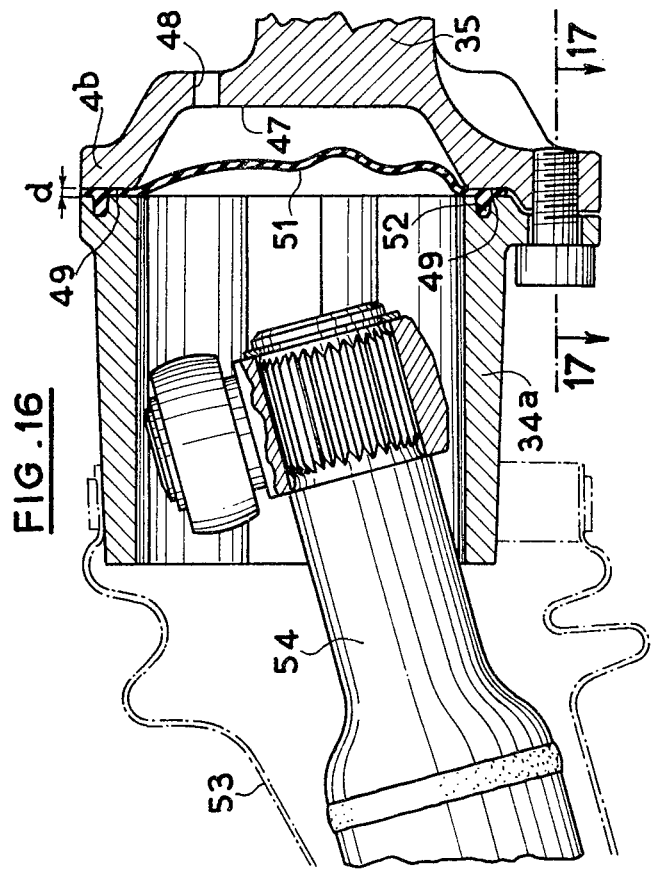
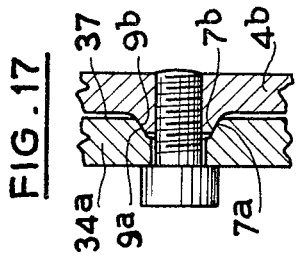
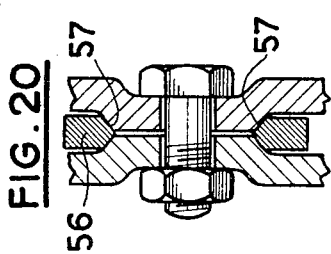
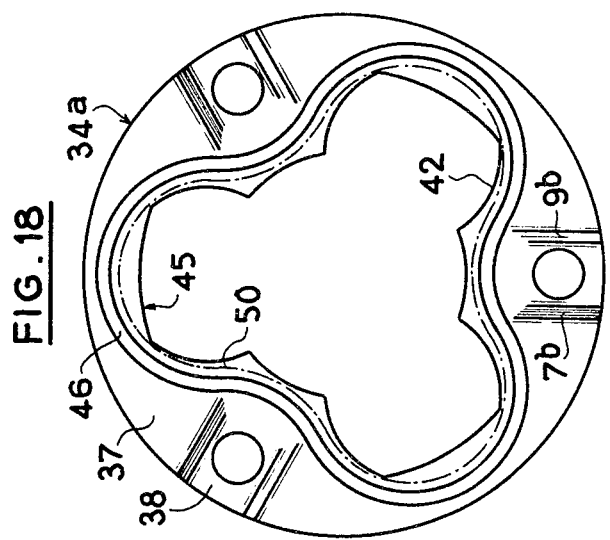
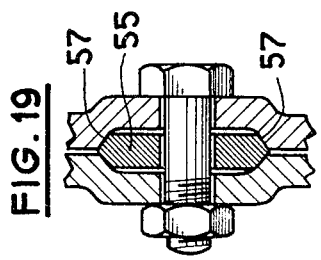

TORQUE TRANSMITTING ELEMENT AND DEVICE

The present invention relates to connecting elements employed in transmissions.

In many industrial applications, and in particular in automobile vehicles, driving power is transmitted from a driving means to a driven means by a transmission comprising rotating shafts. It is often necessary, in order to facilitate manufacture, assembly and maintenance and for reasons of standardization, to construct the transmission in several sections which are interconnected by elements capable of transmitting the torques. These elements must ensure both the fixing together and the radial centering of the transmission parts they interconnect. One of the two elements interconnected is usually constituted by a flange.

The transmission elements must be preferably interchangeable and easy to assemble and must be capable of transmitting with reliability alternating torques and ensure a perfect centering without play. In practice, the only transmission elements which satisfy these conditions at sufficiently low cost for mass-production comprise an annular centering shoulder and a continuous, usually planar, bearing surface which is provided with a number of peripheral apertures through which bolts extend.

Although universally employed, this arrangement has the following drawbacks:

in order to ensure an interchangeability and an easy assembly, the diameter of the apertures must be a few tenths of a millimeter larger than the diameter of bolts; now, in order that the transmission of torque be reliable, it must occur solely by the adherence of the annular bearing surfaces which consequently depends on the clamping force of the bolts; this force must consequently be very large in order to avoid any risk of relative sliding of the bearing surfaces, since such a sliding results in contact corrosion and a loosening of the bolts under the effect of alternating torques; consequently, many bolts of large section have to be employed which results in an increase in the cost of production and assembly and an increase in the diametral overall size of the flanges which precludes the use of this flange assembly in a confined space;

in order to obtain a perfect relative radial centering and ensure the interchangeability of the elements, the cylindrical shoulders must be produced within very narrow fitting tolerances, which constitutes a certain difficulty in mass-production and very substantially increases the cost.

An object of the invention is to provide a connecting element which satisfies in a more reliable and cheap manner the aforementioned conditions.

According to the invention, there is provided a connecting element for a transmission, comprising a small number of pairs of bearing planes, the two planes of each pair being convergent relative to each other in the direction away from the connecting face of the element and facing axially outwardly of the element and forming two sides of a channel or projection which has a constant trapezoid sectional shape which is symmetrical relative to a plane containing the axis of rotation of the element, the neighbouring pairs of bearing planes being angularly spaced apart.

In the case where the connecting element is formed by a generally planar flange, the pairs of planes may be simultaneously formed very simply by a cold deformation of the flange. The two surfaces of each pair then form two faces of an impression or dishing which is axially offset from the general plane of the flange, the thickness of the flange being roughly uniform at all points thereof.

In the case where the connecting element is formed by a bottom-less tulip element of a tripod type joint, it is very advantageous to arrange that the connecting face of the tulip element have a recess having three lobes in which is received a beading of a closing element, and three pairs of bearing planes interposed between the lobes.

Another object of the invention is to provide a connecting device for a transmission which comprises two connecting elements such as defined hereinbefore and cooperating solely by their pairs of bearing planes, and axial clamping means for clamping the two elements together.

In the case where one of the two elements is a tulip element of a tripod type joint such as defined hereinbefore, the beading is preferably clamped by the second element which has a recess therefor.

Further features and advantages of the invention will be apparent from the ensuing description which is given merely by way of example with reference to the accompanying drawings in which:

FIG. 1 is a side elevational view, partly in section on line 1—1 of FIG. 2, of a connecting device according to the invention applied to the connection of a universal joint;

FIG. 2 is a partial sectional view taken on line 2—2 of FIG. 1;

FIG. 3 is an axial view, taken on line 3—3 of FIG. 1, of a connecting element of this device;

Figure 6:
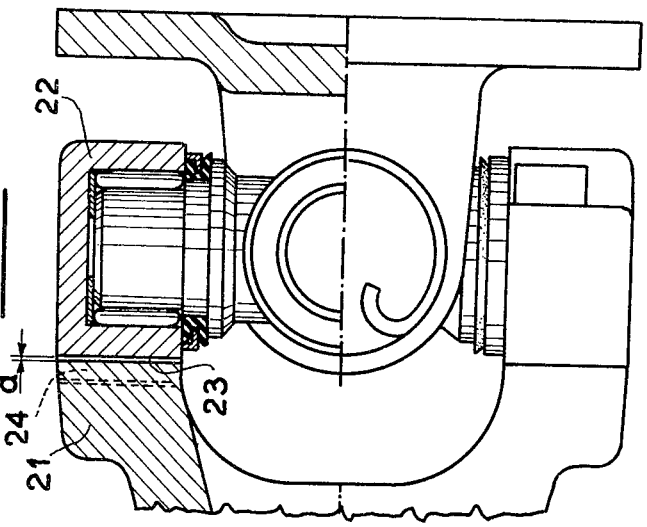
Figure 4:
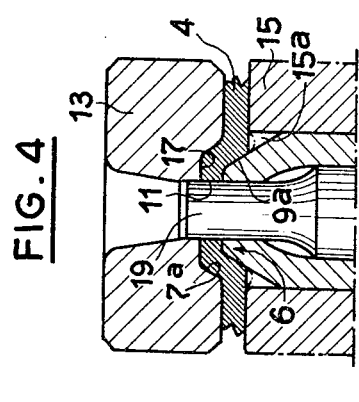
Figure 5:
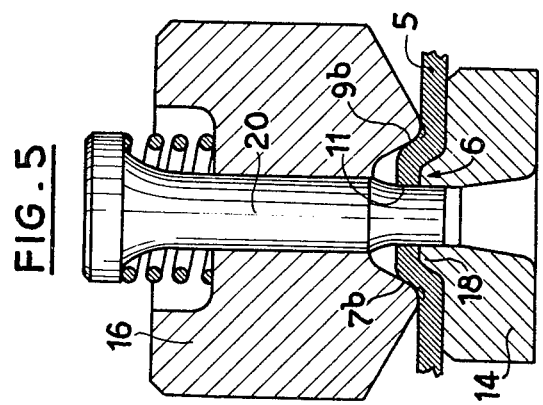
Figure 8:
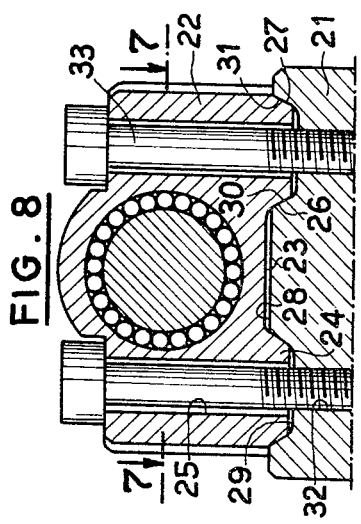
Figure 7:
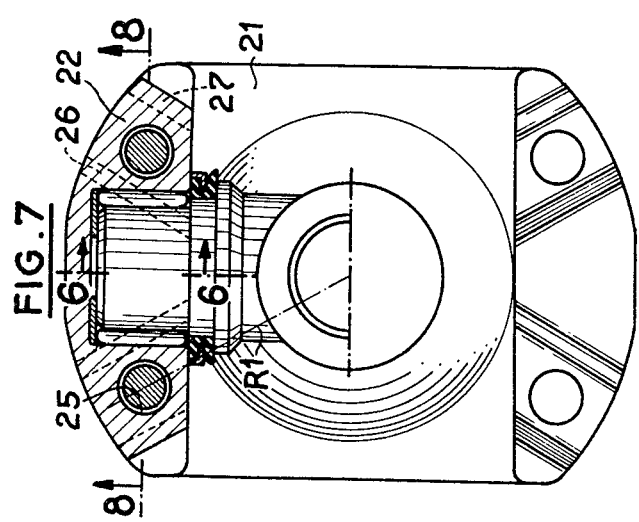

FIGS. 4 and 5 diagrammatically illustrate in section the manufacture of the connecting element of FIG. 3;

FIG. 6 is a side elevational view, partly in section on line 6—6 of FIG. 7, of another connecting device according to the invention applied to the fixing of bearings on a yoke of a universal joint;

FIG. 7 is a sectional view taken on line 7—7 of FIG. 8;

FIG. 8 is a partial sectional view taken on line 8—8 of FIG. 7;

FIG. 9 is an axial sectional view of another embodiment of the connecting device according to the invention, applied to the connection of a tulip element of a tripod type joint;

FIG. 10 is a partial sectional view taken on line 10—10 of FIG. 9;

FIG. 11 is a sectional view taken on line 11—11 of FIG. 10;

FIG. 12 is an axial sectional view of a modification of the device of FIG. 9 taken on line 12—12 of FIG. 13;

FIG. 13 is an axial view of this modification of the left side of FIG. 12;

FIG. 14 is a partial sectional view taken on line 14—14 of FIG. 13;

FIG. 15 is a half-sectional view of a modification of the device of FIGS. 13 to 14;

FIG. 16 is an axial sectional view of another application of the invention to a tripod type joint;

FIG. 17 is a partial sectional view taken on line 17—17 of FIG. 16;

FIG. 18 is an axial view of the right end of the tulip element of this tripod type joint shown in FIG. 16, and FIGS. 19 and 20 are partial sectional views of modifications of connecting devices according to the invention.

FIGS. 1 to 3 illustrate the connection of a universal joint 1 to a transmission shaft or hub 2 having an axis X—X. This shaft 2 and a yoke 3 of the joint 1 are each provided with an end flange 4, 5 which respectively have the general shape of a planar disc perpendicular to the axis X—X and have parallel faces.

The flange 4 has four identical impressions or dishings 6 which are evenly spaced apart around its periphery. Geometrically, each impression 6 has the general shape of a channel which is symmetrical relative to a plane containing the axis X—X and has a constant trapezoid section. This channel starts at the periphery of the flange and extends radially a distance which is between 10% and 30% of the diameter of the latter. The lateral walls 7 and 9 of the impression 6 constitute bearing planes and make the same angle $\alpha$ relative to a perpendicular to the general plane P of the flange. The bottom or intermediate wall 10 of the impression or dishing 6 defines an intermediate plane between the bearing planes and is provided at its centre with a circular aperture 11 which stops short of the bearing planes laterally of the intermediate plane. When viewed in plan (FIG. 3), the lateral walls 7 and 9 have orientations which are parallel to the radius R connecting the centre O of the flange to the centre O' of the aperture; the four bottom walls 10 of the impressions 6 are located in the same general plane Q parallel to the plane P.

The thickness of the flange is roughly uniform at all points. All the connections between the various faces include fillets of radiused corners.

The peripheral portion of the flange 5 of the yoke 3 has a similar configuration except that its impressions or dishings 6 project outwardly from its end face instead of being set back as those of the flange 4. Whereas the active faces $7^a$ and $9^a$ of the flange 4 are the inner faces of the walls 7 and 9, the active faces $7^b$ and $9^b$ of the flange 5 are the faces of the walls 7 and 9 which are outside the impressions 6 of this flange.

When the two flanges 4 and 5 are assembled as shown in FIG. 2, the surfaces $7^a$ and $9^a$ of the flange 4 bear against the surfaces $7^b$ and $9^b$ of the flange 5, and there is no other zone of contact between these flanges. The confronting planar surfaces of the two flanges are spaced apart a distance d. Bolts 12 having nuts $12^a$ extend with clearance through the apertures 11 and bear against the opposed faces of the bottoms 10 of the two flanges so as to axially clamp them together.

This connection has a very high torque transmitting capacity. It can be shown that, with a metal-to-metal coefficient of friction of 0.1 and an angle $\alpha=30°$, the required axial clamping force of the bolts for transmitting a given torque is 1/22 of that required in the case of a conventional flange connection having annular planar faces clamped to each other. Consequently, it is possible for example to reduce the number of bolts from 8 to 4 and decrease the section of the bolts in the ratio of 11 to 1, that is to say replace a bolt having a diameter of 16 by a bolt having a diameter of 5 mm. In practice, for reasons of homogeneity and continuity of the connection of the kinematic chain, the torque not being the sole parameter to be taken into consideration, bolts having a diameter of 8 mm will be chosen, so as to guarantee complete operational safety.

Although the torque transmitting capacity increases when the angle $\alpha$ decreases, it is not desirable to choose for this angle a value very much lower than 30° since many drawbacks then arise: the contact pressures rapidly rise on the active flanks $7^a$, $9^a$ and $7^b$, $9^b$ of the impressions which bring about permanent deformations or bursting. Machining defects are accentuated by this reduced angle and contributes still more to the creation of local concentrations of pressure. There appears a tendency to a misalignment and a jamming if all the bolts are not tightened simultaneously, and it is known that it is practically impossible to tighten bolts simultaneously, even if there are only four bolts. A deterioration of the bearing surfaces results which render them unsuitable to ensure the desired centering. The reduction in the angle $\alpha$ also results in increasing the number of impressions and consequently the difficulties of machining and the cost. This is why the angle $\alpha$ is chosen to be between 15° and 45° in practice.

The impressions 6 are obtained very cheaply by a simple cold forming operation; as shown in FIGS. 4 and 5, there is employed a die 13 (for the flange 4) or 14 (for the flange 5) and an associated punch 15, 16 corresponding to the desired end face of the flange. Thus the die 13 has three recesses 17 and the die 14 has four projections 18. The punches reproduce with precision the bearing surfaces $7^a$, $9^a$ and $7^b$, $9^b$ and effect the deformation of the initially planar flange on the corresponding die. At the end of the travel of the punch, an elastically biased member 19, 20 guided in the punch pierces an aperture 11 in each stamping 6. These apertures 11 are made slightly larger than the diameters of the bolts and without precision, since they merely have for function to allow a passage for these bolts. They are consequently left as punched.

This forming operation is carried out cold on the parts carrying the flanges which are already heat treated to their final hardness; it increases still further the surface hardness of the bearing surfaces $7^a$, $9^a$ and there is no risk of its shearing or tearing the basic metal. Owing to the simultaneous forming of all the impressions 6 of each flange, the pairs of flanges $7^a$, $9^a$ or $7^b$, $9^b$ are perfectly positioned and the flanges are absolutely interchangeable.

The tooling can be constructed with a perfect geometry owing to grinding after hardening and stabilization and can reproduce with fidelity this regularity on the flanges obtained. Sliding is small and wear negligible; the tools are not subjected to exaggerated stresses and should not present problems of fracture due to fatigue. In practice, tens of thousands of flanges can be produced without freshening up or grinding the active planes of the tooling, which are solely those corresponding, on one hand, to the bearing surfaces $7^a$, $9^a$ and $7^b$, $9^b$ and, on the other hand, to the surfaces against which the heads of the bolts 12 and the nuts $12^a$ bear. Further, this rectification of the tools is easy to carry out owing to the simplicity of the profile and to the fact that the surfaces $7^a$ and $9^a$ of a given impression have parallel orientations and that those of two opposed impressions are in the extension of one another.

The impressions 6 can then be subsequently employed for positioning very simply and perfectly the flanges 4 and 5 on conventional machine tools provided with plates carrying pairs of inclined planes complementary to those of these impressions, for example on the boring machine producing the apertures of the ears of the yoke 3 of the universal joint and on the face plate of the lathe for internally machining the shaft or hub 3. In this way, an economy is made of the time and material of the truing up of the facings and of the centerings usually required for the fixing to machine tools.

Note that in the application of the invention to the connection of a universal joint, the overall size of the yoke 3 often results in a circumferential spacing of the four impressions 6 not in a regular manner as illustrated but alternately of about 80° and about 100°.

For certain metals and certain working positions, the formation of the impressions 6 of the flange 4 may cause beads to appear on the side of the punch 15 as shown in dotted line in FIG. 4. Consequently, recesses $15^a$ are provided in this punch and the punch 16 is modified in a similar way as shown in dotted line in FIG. 5 so as to form on the other flange 5 annular recesses capable of receiving these beads so that it can be ensured that the two flanges contact each other only by their bearing surfaces $7^a$, $9^a$ and $7^b$, $9^b$.

FIGS. 6 to 8 show a universal joint at least one yoke 21 of which is provided with detachable bearings 22. These bearings each have a planar connection face 23 in the form of a segment of a circle from which project two bosses 24. Each boss 24 extends generally radially from the circular periphery to the chord of the face 23; the cross-sectional shape of the body part (FIG. 8) is constant and is in the form of an isosceles trapezoid as that of the impressions 6 of FIGS. 1 to 3. A bolt aperture 25 extends through the bearing transversely of the bases of this trapezoid in the centre region of the boss. The inclined lateral walls 26, 27 of each boss, as viewed in plan (FIG. 7), have parallel orientations and, when the bearing is mounted on the yoke 21, they are symmetrical relative to the radial plane containing the radius $R^1$ between the axis of this yoke and the axis of the aperture 25.

The yoke 21 has, at the end of each branch, a planar connection surface 28 in which are formed two recesses 29 which are substantially conjugate with the bosses 24 and have two inclined faces 30 and 31. A tapped aperture 32 is provided in the bottom of each recess 29.

Upon assembly, the faces 26 and 27 of the bosses 24 bear against the faces 30 and 31 of the recesses 29 and a clearance d exists between the planar zones of the faces 23 and 28 as can be seen in FIGS. 6 and 8. Headed screws 23 extend through the apertures 25 with clearance and are screwed into the apertures 32 to produce the relatively moderate clamping force required for the transmission of the torque. As in the embodiment of FIGS. 1 to 3, this assembly permits the transmission of high and alternating torques without any sliding and without play and the interchangeability is perfect. The inclined planes may be produced either by a cold forming operation or by machining.

FIGS. 9 to 11 illustrate the application of the invention to the connection of a tulip element 34 of a tripod type joint to a shaft 35. The latter is provided at its end with a flange $4a$ which is similar to the flange 4 of FIG. 1 but has only three pairs of inclined bearing planes $7^b$–$9^b$. These inclined planes are defined on bosses 36 which are angularly offset 120° from each other and are produced not by a cold forming operation but by machining.

The connection face 37 of the tulip element 34 has three recesses 38 having inclined planes $7^a$–$9^a$ which are also machined. The sole contact surfaces between the flange $4a$ and the tulip element are the inclined planes $7^a$–$9^a$ and $7^b$–$9^b$. Three screws 39 freely extend through the apertures 40 of the flange which are formed axially in the bosses 36 and are screwed in tapped apertures 41 provided at the bottom of the recesses 38 so as to ensure the axial clamping.

In the circumferential direction, the recesses 38 are provided in the regions of the tulip element located between the raceway grooves 42. By way of a modification, they could be formed in the axial extension of the grooves which would permit reversing the direction of the screws 39.

FIGS. 12 to 14 show a modification of the device of FIG. 9 in which the bolt apertures are dispensed with and the force for maintaining the axial assembly is provided by an exterior nut 43 which is screwed on the breech portion 44 of the tulip element 34. This nut is advantageously of pressed sheet metal and the threads are obtained by a cold rolling operation. One end of the nut, which is formed over inwardly before screwing, bears against the rear face of the flange $4^a$. The other end edge of the nut 43 is formed over, after the nut has been tightened, into a groove 45 in the tulip element so as to prevent any unscrewing of this nut. It will be observed that, in the modification of FIGS. 12 and 13, the bosses 36 and recesses 38 are respectively provided on the tulip element and on the flange.

FIG. 15 shows a modification of this assembly in which the nut 43 is screwed on the screwthreaded periphery of the flange $4^a$. An edge portion of the nut is formed over into the groove 45 of the tulip element whereas the other edge portion is formed over only locally into a recess 46 in the rear face of the flange for locking the nut.

Tripod-type joints are generally designed so as to define a sealed enclosure permanently containing a lubricant so that the joints are "lubricated for life". FIGS. 16 to 18 show how this requirement can be conciliated with the connecting means of FIGS. 9 to 11, in the case where the tulip element $34^a$ itself does not have a bottom, that is to say when the grooves for the rollers of the tripod-type joint extend from one end to the other of the tulip element.

The connecting face 37 of the tulip element has in its centre an opening 45 having three lobes spaced angularly 120° apart and corresponding to the three raceway grooves 42 of the tripod element. A continuous groove or recess 46 in the face 37 approximately follows the contour of this opening and consequently also has three lobes and three recesses. The recesses 38 (or by way of a modification the bosses) for connecting and centering are formed in front of these three recesses. The centre part 47 of the flange $4^b$ rigid with the shaft 35 is hollow and includes a vent 48. Its connecting face 49 has roughly the same shape, when viewed axially, as the face 37 of the tulip element; it has an opening with three lobes 50 shown in dot-dash line in FIG. 18.

A flexible diaphragm 51 is interposed between the confronting faces 37 (of the tulip element) and 49 (of the flange). This diaphragm has a bead 52 which fits in the groove 46 of the tulip element and the thickness of its body portion, when at rest, exceeds the gap d mentioned above when the two elements $34^a$ and $4^b$ are assembled. This guarantees a predetermined, uniform and constant compression of the elastomer material of the diaphragm. The sealed enclosure is completed in a conventional manner by a gaiter 53 which is fixed to the other end of the tulip element and to the shaft of the tripod element 54. The vent 48 enables the diaphragm 51 to deform freely in the course of the movements of elongation and contraction of the joint.

In any case it is unnecessary to increase the number of pairs of inclined bearing surfaces, such as $7^a$–$8^a$, on a circumference beyond four, since this would result in no further advantage. The assembly is therefore isostatic or at least slightly hyperstatic. Moreover, if, as shown in the drawings, the two bearing surfaces of each pair are parallel when viewed in plan, at least three pairs thereof must be provided. Consequently, in practice, three or four pairs of bearing surfaces on a circumference will be chosen.

As shown in FIGS. 19 and 20, it is possible to interconnect two elements both of which are provided with impressions 6 which project or impressions 6 which constitute recesses. For this purpose, it is sufficient to interpose between the confronting impressions members 55, 56 of suitable shape having inclined planes 57 for transmitting the driving forces from an inclined bearing surface of one element to the corresponding inclined bearing surface of the other, to the exclusion of any other contact between the various surfaces of the assembly.

Having now described my invention what I claim as new and desire to secure by Letters Patent is:

1. A connecting element for a transmission, the element having an axis of rotation and a face adjacent to which a structure is to be connected, the element defining a small number of pairs of bearing planes and an intermediate plane between each pair of planes, the two bearing planes of each pair being convergent in a direction away from said face of the element and facing axially outwardly of the element and forming two flanks of a channel or of a projection which has a constant trapezoid cross-sectional shape which is symmetrically relative to a radial plane containing the axis of rotation of the element neighbouring pairs of bearing planes being angularly spaced apart and a bolt aperture being provided in said intermediate plane between each pair of bearing planes and stopping short of the respective pair of bearing planes transversely of the intermediate plane.

2. An element as claimed in claim 1, wherein the element is substantially circular and the bearing planes of each pair extend from a periphery of the element a distance of between 10% and 20% of the outside diameter of the element.

3. An element as claimed in claim 1, wherein said planes make an angle of between 15° and 45° with a perpendicular to said connecting face.

4. An element as claimed in claim 1, having a symmetry of revolution, the pairs of planes being evenly spaced apart around a periphery of the element.

5. A connecting element as claimed in claim 1, wherein the intermediate plane of a channel has a width which is at least four times the depth of the channel measured from said face of the element.

6. A metal connecting element for a transmission, the element having an axis of rotation and a face adjacent to which a structure is to be connected, the element defining a small number of pairs of bearing planes and an intermediate plane between each pair of planes, the two bearing planes of each pair being convergent in a direction away from said face of the element and facing axially outwardly of the element and forming two flanks of a channel or of a projection which has a constant trapezoid cross-sectional shape which is symmetrically relative to a radial plane containing the axis of rotation of the element, neighbouring pairs of bearing planes being angularly spaced apart, a bolt aperture being provided in said intermediate plane between each pair of bearing planes and stopping short of the respective pair of bearing planes and stopping short of the respective pair of bearing planes transversely of the intermediate plane, the element being constituted by a generally planar flange, the thickness of the flange being substantially uniform throughout the flange, and said bearing planes and intermediate planes being the result of an upsetting and a work-hardening of the metal of the flange by a press operation.

7. An element as claimed in any one of the claims 1 to 5, having a symmetry of revolution and comprising four pairs of planes which are diametrally opposed two by two relative to the axis of rotation.

8. An element as claimed in any one of the claims 1 to 5, having a symmetry of revolution and comprising three pairs of bearing planes which are angularly spaced 120° apart relative to the axis of rotation.

9. An element as claimed in claim 8, constituted by a tulip element of a tripod-type universal joint, the tulip element having a throughway opening, said face of the tulip element defining a groove which has three lobes for receiving a bead of a closing element, and three pairs of bearing planes interposed between the lobes.

10. An element as claimed in claim 9, wherein the closing element is a diaphragm of elastomer.

11. A connecting device for a transmission, comprising two connecting elements, each element having an axis of rotation and a face adjacent to which face the other element is to be connected in coaxial relation, each element defining a small number of pairs of bearing planes and an intermediate plane between each pair of bearing planes, the two bearing planes of each pair being convergent in a direction away from said face of said each element and facing axially outwardly of said each element and forming two flanks of a configuration of the element which has a constant trapezoid cross-sectional shape which is symmetrically relative to a radial plane containing the axis of rotation of said each element, neighbouring pairs of bearing planes being angularly spaced apart and a bolt aperture being provided in said intermediate plane between each pair of bearing planes and stopping short of the respective pair of bearing planes transversely of the intermediate plane, said two elements being in engagement solely by their pairs of bearing planes, the flanks of one of said elements defining channels and the flanks of the other of said elements defining projections engaged in the channels, bolts for axially clamping said two elements against each other, said bolts extending through the bolt apertures pertaining to the interengaged projections and channels, and means defining nuts being screwthreadedly engaged on the bolts.

12. A device as claimed in claim 11, wherein one of said two elements is a tulip element of a tripod-type universal joint, which joint comprises a closing element having a bead, said bead being clamped by the second element which has a vent.

* * * * *